US012797748B2

(12) United States Patent
Zhou et al.

(10) Patent No.: US 12,797,748 B2
(45) Date of Patent: Nov. 17, 2026

(54) VIRTUAL OBJECT CONTROL METHOD AND APPARATUS, DEVICE, MEDIUM, AND PROGRAM PRODUCT

(71) Applicant: Tencent Technology (Shenzhen) Company Limited, Shenzhen (CN)

(72) Inventors: Zhe Zhou, Shenzhen (CN); Shubin Hong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 191 days.

(21) Appl. No.: 18/747,299

(22) Filed: Jun. 18, 2024

(65) Prior Publication Data

US 2024/0335755 A1 Oct. 10, 2024

Related U.S. Application Data

(63) Continuation of application No. PCT/CN2023/087465, filed on Apr. 11, 2023.

(30) Foreign Application Priority Data

Jun. 15, 2022 (CN) ......................... 202210674356.8

(51) Int. Cl.
*A63F 13/69* (2014.01)
*A63F 13/52* (2014.01)
*A63F 13/67* (2014.01)

(52) U.S. Cl.
CPC .............. *A63F 13/69* (2014.09); *A63F 13/52* (2014.09); *A63F 13/67* (2014.09)

(58) Field of Classification Search
CPC .. A63F 13/25; A63F 13/32–35; A63F 13/355; A63F 13/358; A63F 13/44;
(Continued)

(56) References Cited

U.S. PATENT DOCUMENTS 9,912,562 B2 * 3/2018 Callahan ............... A63F 13/358
2018/0243656 A1 * 8/2018 Aghdaie ................ A63F 13/67
(Continued)

FOREIGN PATENT DOCUMENTS

CN 107398070 A 11/2017
CN 107515825 A 12/2017
(Continued)

OTHER PUBLICATIONS

Tencent Technology, ISR, PCT/CN2023/087465, Aug. 5, 2023, 3 pgs.

*Primary Examiner* — Omkar A Deodhar
(74) *Attorney, Agent, or Firm* — Morgan, Lewis & Bockius LLP

(57) ABSTRACT

This application provides a virtual object control method performed by a computer device. The method includes: obtaining a performance grade and a current frame rate of a terminal; updating the performance grade according to the current frame rate; updating a level attribute of each virtual object according to an updated performance grade; determining a display parameter of the virtual object is determined according to an updated level attribute of the virtual object; and controlling a corresponding virtual object according to the display parameter of the virtual object. According to the virtual object control method, level attributes of different virtual objects and display parameters corresponding to different level attributes are determined through different performance grades of a terminal, so that differentiated control is implemented on different virtual objects in a target game, thereby improving a dynamic adaptation capability of performance optimization, and omitting a process of manual adjustment by a player.

15 Claims, 8 Drawing Sheets

(58) Field of Classification Search
CPC .......... A63F 13/45; A63F 13/52; A63F 13/60; A63F 13/67; A63F 13/69; A63F 13/70; A63F 13/77; A63F 2300/40; A63F 2300/401–408; A63F 2300/51; A63F 2300/513; A63F 2300/53; A63F 2300/531; A63F 2300/534; A63F 2300/535; A63F 2300/538; A63F 2300/5593; A63F 2300/6009
See application file for complete search history.

(56) References Cited

U.S. PATENT DOCUMENTS

| | | | | |
|---|---|---|---|---|
| 2021/0146240 | A1* | 5/2021 | Colenbrander | A63F 13/335 |
| 2022/0096931 | A1* | 3/2022 | Raymond | G06T 13/00 |
| 2024/0335755 | A1* | 10/2024 | Zhou | A63F 13/45 |

FOREIGN PATENT DOCUMENTS

| | | | |
|---|---|---|---|
| CN | 109771949 | A | 5/2019 |
| CN | 109966739 | A | 7/2019 |
| CN | 114210052 | A | 3/2022 |
| JP | 2020077270 | A | 5/2020 |
| JP | 2020185208 | A | 11/2020 |

* cited by examiner

VIRTUAL OBJECT CONTROL METHOD AND APPARATUS, DEVICE, MEDIUM, AND PROGRAM PRODUCT

CROSS-REFERENCE TO RELATED APPLICATIONS

This application is a continuation application of PCT Patent Application No. PCT/CN2023/087465, entitled "VIRTUAL OBJECT CONTROL METHOD AND APPARATUS, DEVICE, MEDIUM, AND PROGRAM PRODUCT" filed on Apr. 11, 2023, which claims priority to Chinese Patent Application No. 202210674356.8, entitled "VIRTUAL OBJECT CONTROL METHOD AND APPARATUS" filed with the China National Intellectual Property Administration on Jun. 15, 2022, both of which are incorporated herein by reference in their entirety.

FIELD OF THE TECHNOLOGY

This application relates to the field of computer technologies, and in particular, to virtual object control.

BACKGROUND OF THE DISCLOSURE

With the development of the Internet, game applications have an increasingly high share on the market, and a complexity of a game also increases, inevitably introducing various performance problems. To improve experience of a game player, game performance needs to be optimized.

Taking a player versus environment (PVE) game as an example, in the related art, a solution for optimizing PVE game performance usually only provides a few fixed optimization combinations, and during a game, a player needs to manually adjust the optimization combination according to a situation such as game frame freezing or the like, resulting in poor game experience.

SUMMARY

Embodiments of this application provide a virtual object control method and a related apparatus. Level attributes of different virtual objects and display parameters corresponding to different level attributes are determined through different performance grades of a terminal, so that differentiated control is implemented on different virtual objects in a target game, thereby improving a dynamic adaptation capability of performance optimization, and omitting a process of manual adjustment by a player.

According to a first aspect of this application, a virtual object control method is provided, including:

- obtaining a performance grade and a current frame rate of a terminal running a target game, the performance grade being configured for indicating quantities of virtual objects displayable by the terminal for different level attributes, and each level attribute being configured for identifying an amount of display resources consumed when the terminal displays a virtual object with the level attribute;
- updating the performance grade according to the current frame rate, to obtain an updated performance grade;
- updating a level attribute of each virtual object in the target game according to the updated performance grade, to obtain an updated level attribute of the virtual object;
- determining a display parameter corresponding to the virtual object according to the updated level attribute of the virtual object; and
- controlling the corresponding virtual object by using the display parameter corresponding to the virtual object.

According to another aspect of this application, a computer device is provided, including:

- a memory, a transceiver, a processor, and a bus system;
- the memory being configured to store a computer program;
- the processor being configured to execute the computer program in the memory, to perform the method according to the foregoing aspects; and
- the bus system being configured to connect the memory and the processor, to cause the memory to communicate with the processor.

According to another aspect of this application, a non-transitory computer-readable storage medium is provided, the computer-readable storage medium having a computer program stored therein, and the computer program, when executed by a processor of a computer device, causing the computer device to perform the method according to the foregoing aspects.

According to the foregoing technical solutions, it can be learned that the embodiments of this application have the following advantages:

After a performance grade and a current frame rate of a terminal are obtained, the performance grade is updated according to the current frame rate. Since the performance grade can indicate quantities of virtual objects displayable by the terminal for different level attributes, a level attribute of each virtual object may be updated according to an updated performance grade, and a display parameter of the virtual object may be determined according to an updated level attribute of the virtual object, to perform display control on the corresponding virtual object on the terminal based on the display parameter. Level attributes of different virtual objects and display parameters corresponding to different level attributes are updated through different performance grades of the terminal. Since the current frame rate can reflect current display performance of the terminal, the level attribute and the display parameter obtained through updating based on the current frame rate can be more suitable for the display performance. That is, by performing the display control on the virtual object through the display parameter, a better display effect at the current frame rate can be obtained, and the display parameter can be dynamically adapted as the current frame rate changes. Moreover, the level attribute of the virtual object is updated based on the updated performance grade, so that virtual objects originally having the same level attribute may have a level attribute difference after updating, and the difference is finally reflected in the display control, thereby implementing differentiated control on different virtual objects in a target game based on the current frame rate.

DESCRIPTION OF EMBODIMENTS

Embodiments of this application provide a virtual object control method. Level attributes of different virtual objects and display parameters corresponding to different level attributes are determined through different performance grades of a terminal, so that differentiated control is implemented on different virtual objects in a target game, thereby improving a dynamic adaptation capability of performance optimization, and omitting a process of manual adjustment by a player.

The terms "first", "second", "third", "fourth", and the like (if exists) in the specification and the claims of this application and the foregoing accompanying drawings are configured for distinguishing similar objects, and are not necessarily configured for describing a particular sequence or order. Data used in this way is interchangeable in a proper case, so that the embodiments of this application described herein can be implemented in a sequence different from the sequence shown or described herein. In addition, the terms "include", "corresponding to" and any other variants are intended to cover non-exclusive inclusion. For example, a process, method, system, product, or device that includes a series of steps or units is not necessarily limited to those expressly listed steps or units, but may include other steps or units not expressly listed or inherent to such a process, method, product, or device.

Generally, there are three main ideas for optimizing game performance: 1. Resolve a performance problem caused by a current unreasonable implementation. 2. Trade space for time. For example, memory occupation of a game is reduced, so that game performance is improved. 3. Trade quality for time. For example, fluency of a game is reduced, so that the game performance is improved.

The ideas for improving the game performance provided in this embodiment of this application is mainly oriented to a PVE game containing non-player characters (NPCs). Specifically, the ideas for improving the game performance provided in this embodiment of this application may be distinguished and adjusted for three dimensions including fluency, definition, and fineness of each NPC in a game, to improve the game performance. The fluency, the definition, and the fineness of the NPC are changed by adjusting a display parameter of the NPC.

According to the virtual object control method provided in this embodiment of this application, level attributes of different virtual objects and display parameters corresponding to different level attributes are determined through different performance grades of a terminal, so that differentiated control based on a current frame rate is implemented on different virtual objects in a target game, thereby improving a dynamic adaptation capability of performance optimization, and omitting a process of manual adjustment by a player.

Figure 1:
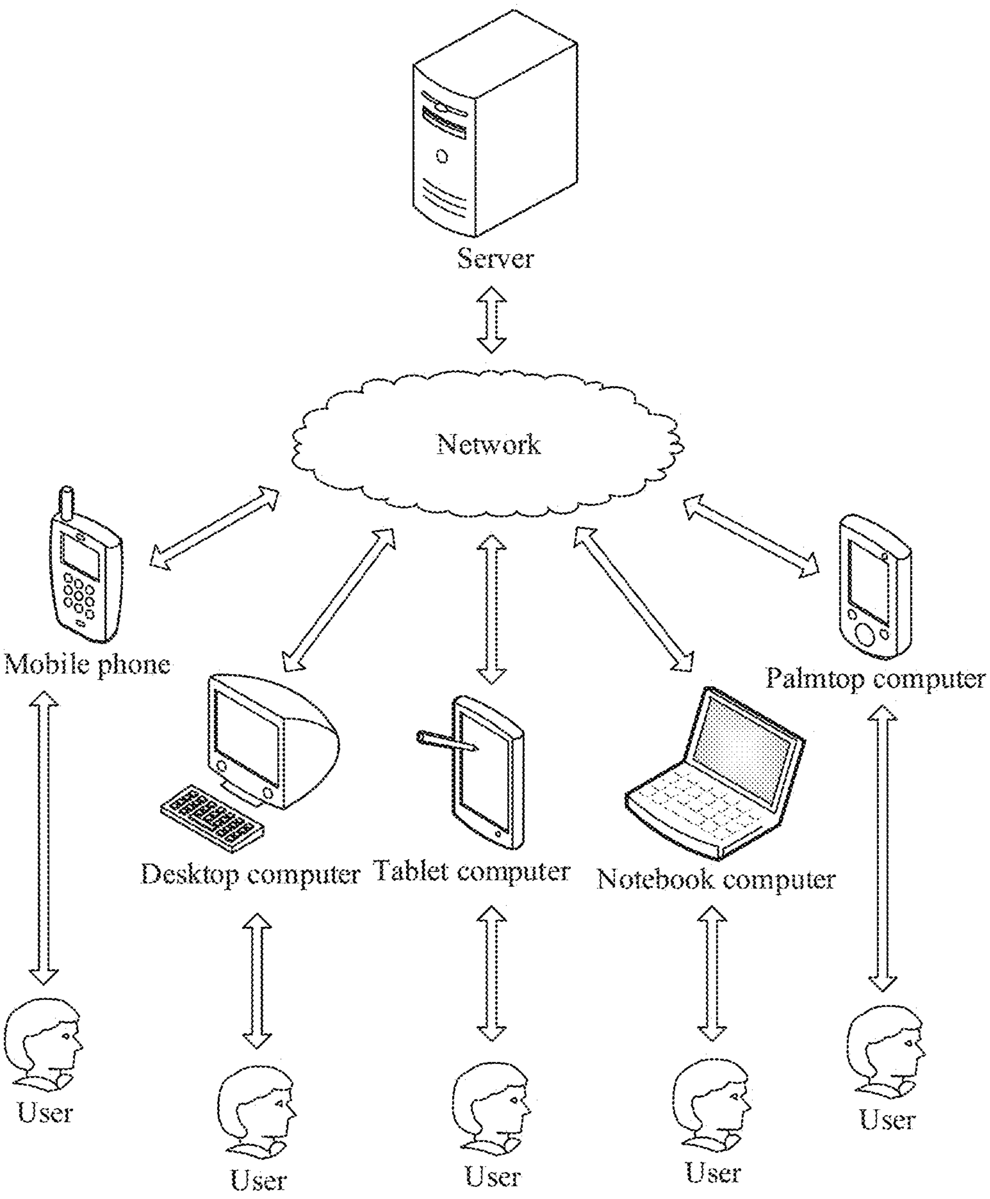
FIG. 1 is a schematic structural diagram of a virtual object control system according to an embodiment of this application.

For case of understanding, referring to FIG. 1, FIG. 1 is a diagram of an application environment of a virtual object control method according to an embodiment of this application. As shown in FIG. 1, the virtual object control method in the embodiments of this application is applicable to a virtual object control system. The virtual object control system may be a computer device, where the computer device includes a server and a terminal. The server may be an independent physical server, or may be a server cluster including a plurality of physical servers or a distributed system, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal includes but is not limited to a mobile phone, a computer, a smart speech interaction device, a smart home appliance, an in-vehicle terminal, and the like. The terminal and the server may be directly or indirectly connected in a wired or wireless communication manner. This is not limited in the embodiments of this application.

When a target game is running, the server first obtains a performance grade and a current frame rate of the terminal. Then, the server updates the performance grade according to the current frame rate, to obtain an updated performance grade. Next, the server updates a level attribute of each virtual object in the target game according to the updated performance grade, to obtain an updated level attribute of the virtual object. Then, the server determines a display parameter corresponding to the virtual object according to the updated level attribute of the virtual object. Finally, the server controls the corresponding virtual object by using the display parameter corresponding to the virtual object.

Figure 2:
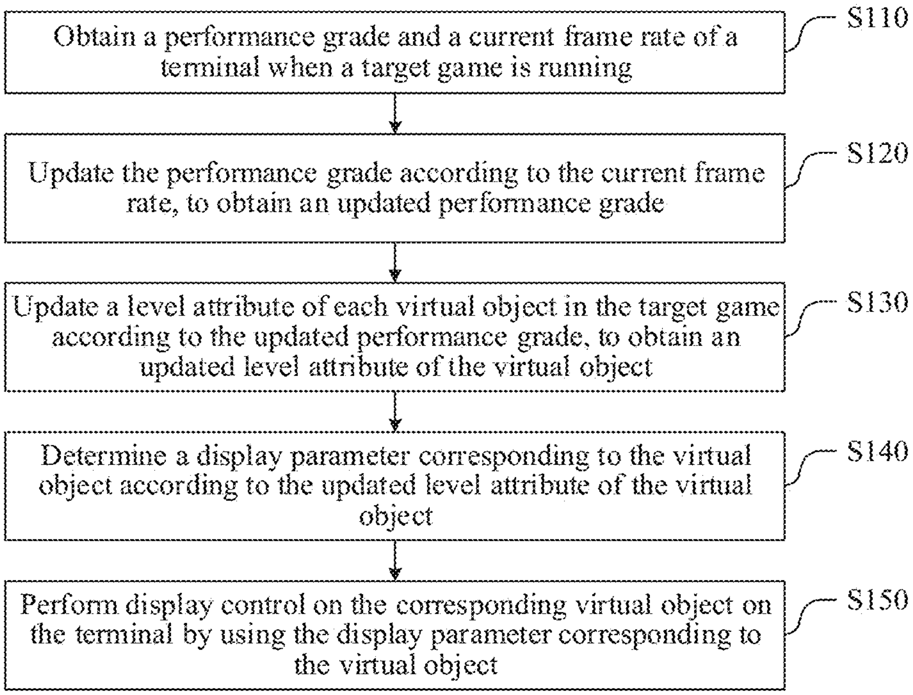
FIG. 2 is a flowchart of a virtual object control method according to an embodiment of this application.

The following describes the virtual object control method in this application from the perspective of a server. Referring to FIG. 2, the virtual object control method provided in this embodiment of this application includes: S110 to S150. Specifically:

S110: Obtain a performance grade and a current frame rate of a terminal when a target game is running.

The performance grade is configured for indicating quantities of virtual objects displayable by the terminal for different level attributes.

The performance grade of the terminal refers to a performance level when the target game is run on the terminal. Quantities of runnable virtual objects with different level attributes supported by different performance grades are at least partially different.

The performance grade of the terminal has a correspondence with the quantities of runnable virtual objects with different level attributes supported by the performance grade.

Each level attribute is configured for indicating an amount of display resources consumed when the terminal displays a virtual object with the level attribute. When the terminal displays virtual objects with the same level attribute, display resources consumed respectively are similar; and when the terminal displays virtual objects with different level attributes, display resources consumed respectively are greatly different. For example, a higher level attribute indicates a greater amount of display resources consumed by the terminal for displaying, and a lower level attribute indicates a smaller amount of display resources consumed by the terminal for displaying.

S120: Update the performance grade according to the current frame rate, to obtain an updated performance grade.

The frame rate refers to a frequency (rate) at which a bitmap image with a frame as a unit continuously appears on a display of the terminal. Generally, a higher frame rate indicates a smoother screen. It can be learned that, when the target game is running, the current frame rate can intuitively reflect current display performance of the terminal. A higher current frame rate indicates better current display performance of the terminal, and in other words, the display performance is more suitable for displaying more virtual objects or improving display quality of the virtual object. A lower current frame rate indicates worse current display performance of the terminal, and in other words, the display performance is less suitable for displaying more virtual objects or improving the display quality of the virtual object.

The performance grade of the terminal can be adjusted according to the frame rate. For example, when the frame rate is less than a first frame rate preset value, it indicates that the display performance of the terminal is low, and the performance grade of the terminal needs to be decreased, to reduce the quantities of displayable virtual objects with different level attributes; or when the frame rate is higher than a second frame rate preset value, it indicates that the display performance of the terminal is high, and the performance grade of the terminal may be increased, to increase the quantities of displayable virtual objects with different level attributes.

S130: Update a level attribute of each virtual object in the target game according to the updated performance grade, to obtain an updated level attribute of the virtual object.

The level attribute of the virtual object is adjusted according to quantities of displayable virtual objects corresponding to the updated performance grade. Specifically, all virtual objects may be sorted according to importance scores of the virtual objects in the target game, and the level attribute of the virtual object is adjusted according to a sorting result and a quantity of level attributes corresponding to the updated performance grade; or the level attribute of the virtual object is randomly adjusted, to meet a quantity of virtual objects with each level attribute corresponding to the updated performance grade.

In this operation, a quantity of virtual objects that need to be updated may vary in different application scenarios. For example, the virtual objects may be all virtual objects in the target game, or virtual objects that need to be displayed in a display region of the terminal in the target game, where the virtual objects may be a part of all the virtual objects in the target game.

S140: Determine a display parameter corresponding to the virtual object according to the updated level attribute of the virtual object.

The display parameter refers to a control parameter when display control is performed on the virtual object. Specifically, the display parameter may include at least one of a fluency display parameter, a realism display parameter, or a fineness display parameter.

Different level attributes correspond to different display parameters. A higher level attribute corresponds to a greater quantity and more types of display parameters.

S150: Perform display control on the corresponding virtual object on the terminal by using the display parameter corresponding to the virtual object.

Display control may be performed on the virtual object on the terminal according to the display parameter of the virtual object, to implement differentiated control that different virtual objects have different display parameters.

In a specific implementation of the embodiments of this application, the performance grade of the terminal is divided into three performance grades: A, B, and C, and the level attribute of the virtual object is divided into three levels: high, medium, and low. A correspondence between the performance grades of the terminal and the quantities of displayable virtual objects with different level attributes supported by the performance grades is shown in Table 1. The display parameter includes at least one of a fluency display parameter, a realism display parameter, or a fineness display parameter, where the fluency display parameter includes a client model interpolation mode, collision detection and movement prediction, and local simulation of root motion; the realism display parameter includes a physical being-attacked feedback, a death physical animation, and a high overhead animation node; and the fineness display parameter includes a client simulation update frequency and a client animation update frequency. Display parameters corresponding to different level attributes are shown in Table 2.

TABLE 1

| | Performance grade | | |
|---|---|---|---|
| Level attribute | A | B | C |
| High | 5 | 3 | 0 |
| Medium | 10 | 7 | 5 |
| Low | 15 | 20 | 15 |

TABLE 2

| | Fluency display parameter | | | Realism display parameter | | | Fineness display parameter | |
|---|---|---|---|---|---|---|---|---|
| Level attribute | Client model interpolation mode | Collision detection and movement prediction | Local simulation of root motion | Physical being-attacked feedback | Death physical animation | High overhead animation node | Client simulation update frequency | Client animation update frequency |
| High | Exponential interpolation | Enable | Enable | Enable | Enable | Enable | High frequency | High frequency |
| Medium | Exponential interpolation | Disable | Disable | Disable | Disable | Disable | Medium frequency | Medium frequency |

TABLE 2-continued

| | Fluency display parameter | | | Realism display parameter | | | Fineness display parameter | |
|---|---|---|---|---|---|---|---|---|
| Level attribute | Client model interpolation mode | Collision detection and movement prediction | Local simulation of root motion | Physical being-attacked feedback | Death physical animation | High overhead animation node | Client simulation update frequency | Client animation update frequency |
| Low | Exponential interpolation | Disable | Disable | Disable | Disable | Disable | Low frequency | Low frequency |

When the target game is running, a current performance grade of the terminal is the grade A, and a total of 30 virtual objects are displayed on a current screen, where there are five virtual objects with a high-level level attribute, 10 virtual objects with a medium-level level attribute, and 15 virtual objects with a low-level level attribute. A current frame rate is obtained, and the current frame rate is compared with a preset frame rate to obtain that the current frame rate is less than the preset frame rate, so that the performance grade of the terminal is decreased, that is, the performance grade of the terminal is adjusted to the grade B. Corresponding to the grade B, there are three virtual objects with the high-level level attribute, seven virtual objects with the medium-level level attribute, and 20 virtual objects with the low-level level attribute. A manner of updating the level attribute of the virtual object may be performing importance sorting on the 30 virtual objects. According to a sorting result, level attributes of virtual objects ranked 1 to 3 are updated to the high level, level attributes of virtual objects ranked 4 to 10 are updated to the medium level, and level attributes of virtual objects ranked 11 to 20 are updated to the low level. The manner of updating the level attribute of the virtual object may alternatively be randomly keeping level attributes of three virtual objects in the five virtual objects with the high-level level attribute as the high level, and updating level attributes of the remaining two virtual objects to the medium level; randomly keeping level attributes of five virtual objects in the original 10 virtual objects with the medium-level level attribute as the medium level, forming the original five virtual objects with the medium-level level attribute and the two virtual objects decreased from the high level to the medium level into seven medium-level virtual objects, and updating the remaining five virtual objects to low-level virtual objects; and forming the original 15 virtual objects with the low-level level attribute and the five virtual objects decreased from the medium level to the low level into 20 low-level virtual objects. The virtual object is controlled according to the updated level attribute of the virtual object and the display parameters corresponding to different level attributes.

According to the virtual object control method provided in this embodiment of this application, level attributes of different virtual objects and display parameters corresponding to different level attributes are determined through different performance grades of a terminal, so that differentiated display control is implemented on different virtual objects in a target game, thereby improving a dynamic adaptation capability of performance optimization, and omitting a process of manual adjustment by a player.

Figure 3:
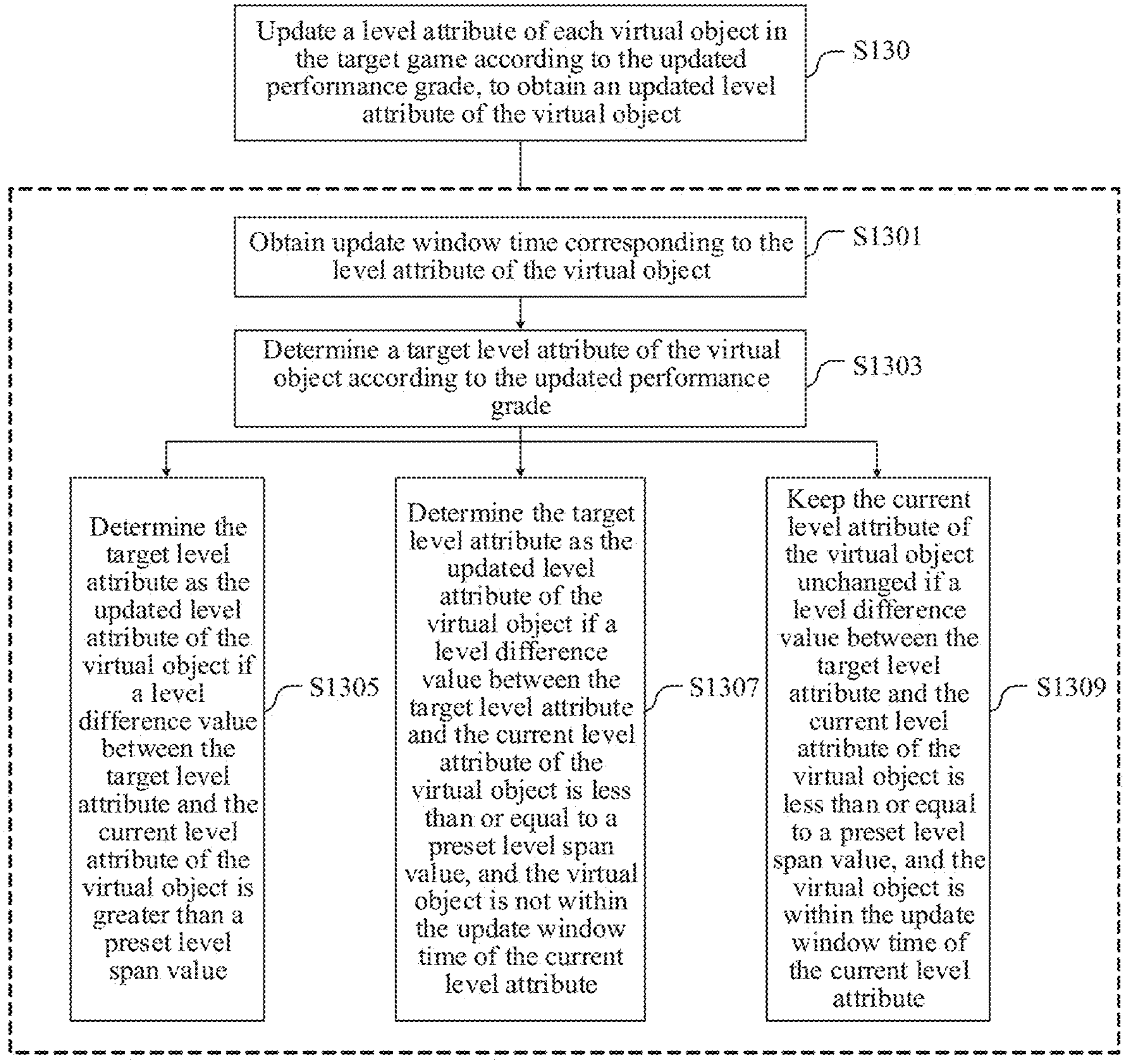
FIG. 3 is a flowchart of a virtual object control method according to another embodiment of this application.

In an optional embodiment of the virtual object control method provided in the embodiment corresponding to FIG. 2 of this application, referring to FIG. 3, S130 includes S1301 to S1309. S1305, S1307, and S1309 are parallel operations. Specifically:

S1301: Obtain update window time corresponding to the level attribute of the virtual object.

To prevent shaking of a rank of the virtual object, the update window time is set, where the update window time may be a difference value between last update time and current update time. If the update window time is 1 second, last update time of a virtual object is 06:05:03:07 (6 hours 5 minutes 3 seconds 7 milliseconds), and current update time is 06:05:03:58 (6 hours 5 minutes 3 seconds 58 milliseconds), a difference value between the last update time and the current update time is 21 milliseconds, which is less than the update window time of 1 second, so that the virtual object is within the update window time. If the update window time is 1 second, last update time of a virtual object is 06:05:03:07 (6 hours 5 minutes 3 seconds 7 milliseconds), and current update time is 06:05:04:10 (6 hours 5 minutes 4 seconds 10 milliseconds), a difference value between the last update time and the current update time is 1 second and 3 milliseconds, which is greater than the update window time 1 second, so that the virtual object is not within the update window time.

S1303: Determine a target level attribute of the virtual object according to the updated performance grade.

S1305: Determine the target level attribute as the updated level attribute of the virtual object if a level difference value between the target level attribute and the current level attribute of the virtual object is greater than a preset level span value.

If the current level attribute of the virtual object is the high level, after the performance grade is updated, if the target level attribute of the virtual object is the medium level, the level difference value is 1; or if the target level attribute of the virtual object is the low level, the level difference value is 2. Usually, the preset level span value is 1.

S1307: Determine the target level attribute as the updated level attribute of the virtual object if a level difference value between the target level attribute and the current level attribute of the virtual object is less than or equal to a preset level span value, and the virtual object is not within the update window time of the current level attribute.

S1309: Keep the current level attribute of the virtual object unchanged if a level difference value between the target level attribute and the current level attribute of the virtual object is less than or equal to a preset level span value, and the virtual object is within the update window time of the current level attribute.

In a specific implementation of the embodiments of this application, the level attribute of the virtual object is divided into three levels: high, medium, and low, and the preset level span value is 1. When the target game is running, a current level attribute of a virtual object A is a high level, the update window time is 1 second, and a target level attribute of the virtual object A is a low level. In this case, regardless of whether the virtual object A is within the update window time, the level attribute of the virtual object A is set to the low level during this update. A current level attribute of a virtual object B is a high level, the update window time is 1 second, a target level attribute of the virtual object B is a medium level, and the virtual object B is not within the update window time. In this case, the level attribute of the virtual object B is set to the medium level during this update. A current level attribute of a virtual object C is a high level, the update window time is 1 second, a target level attribute of the virtual object C is a medium level, and the virtual object C is within the update window time. In this case, the current level attribute is kept unchanged during this update, that is, the high level is kept until next update.

According to the virtual object control method provided in this embodiment of this application, by setting update window time, a shaking problem of a virtual object during level updating is resolved, improving quality of a game screen.

Figure 4:
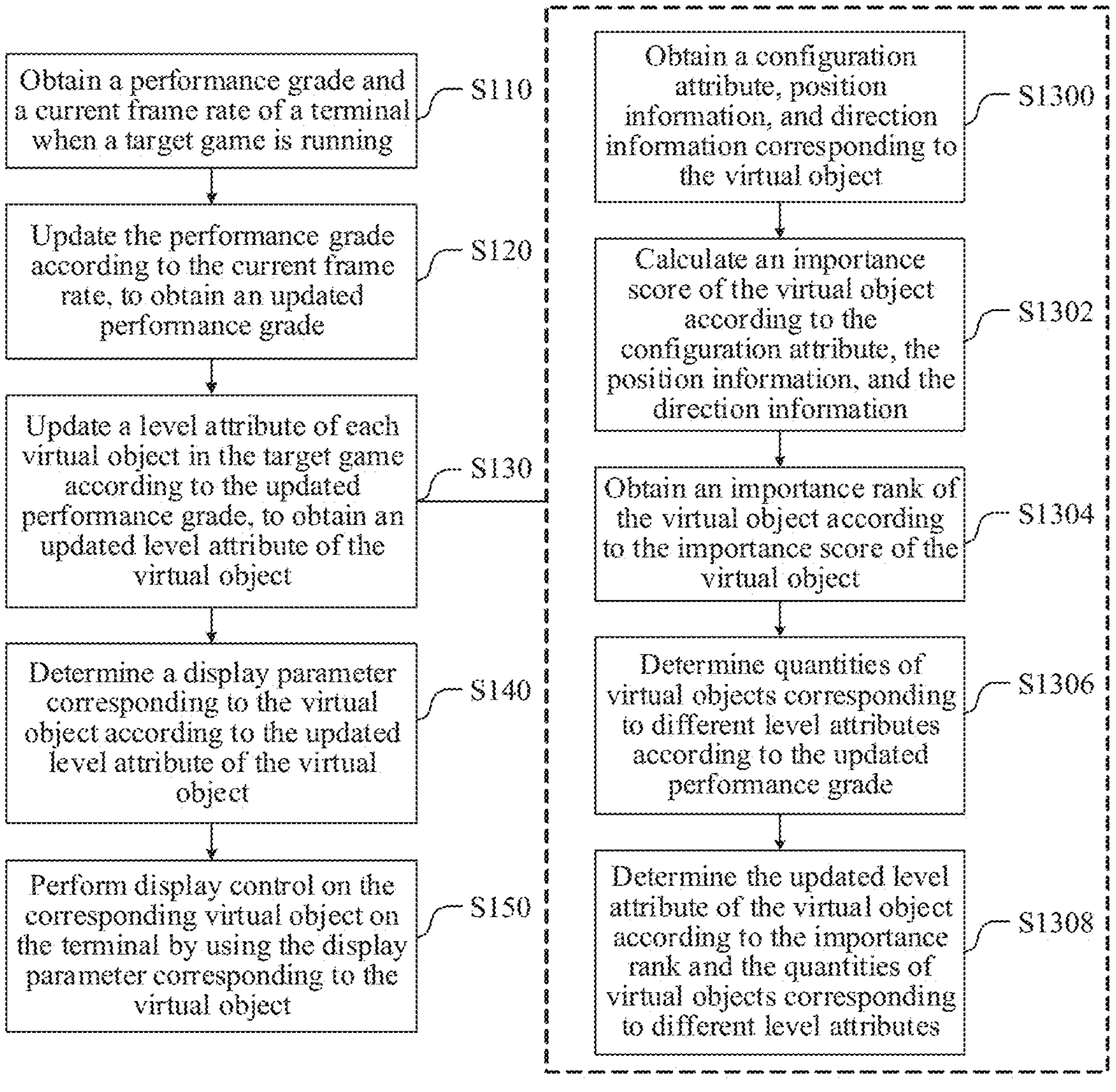
FIG. 4 is a flowchart of a virtual object control method according to another embodiment of this application.

In an optional embodiment of the virtual object control method provided in the embodiment corresponding to FIG. 2 of this application, referring to FIG. 4, S130 includes S1300 to S1308. Specifically:

S1300: Obtain a configuration attribute, position information, and direction information corresponding to the virtual object.

The configuration attribute is a built-in attribute of the virtual object, including attribute information such as body shape information, type information, and the like. The position information and the direction information are information of the virtual object presented in a current game screen, and change as a game progress.

S1302: Calculate an importance score of the virtual object according to the configuration attribute, the position information, and the direction information.

S1304: Obtain an importance rank of the virtual object according to the importance score of the virtual object.

All virtual objects are sorted in descending order of importance scores of the virtual objects, to obtain the importance rank.

S1306: Determine quantities of virtual objects corresponding to different level attributes according to the updated performance grade.

S1308: Determine the updated level attribute of the virtual object according to the importance rank and the quantities of virtual objects corresponding to different level attributes.

In a specific implementation of the embodiments of this application, when the target game is running, a current performance grade of the terminal is a grade A (there are five virtual objects with the high-level level attribute, 10 virtual objects with the medium-level level attribute, and 15 virtual objects with the low-level level attribute). An updated performance grade is a grade B (there are three virtual objects with the high-level level attribute, seven virtual objects with the medium-level level attribute, and twenty virtual objects with the low-level level attribute). Configuration attributes, position information, and direction information corresponding to the 30 virtual objects are obtained, and importance scores of the 30 virtual objects are calculated. Importance ranks are obtained by performing importance sorting on the 30 virtual objects according to the importance scores of the 30 virtual objects. According to the importance ranks, level attributes of virtual objects ranked 1 to 3 are updated to the high level, level attributes of virtual objects ranked 4 to 10 are updated to the medium level, and level attributes of virtual objects ranked 11 to 20 are updated to the low level.

According to the virtual object control method provided in this embodiment of this application, by calculating an importance of each virtual object and taking the importance as an updating standard of a level attribute of the virtual object, a virtual object with a high importance is set to a high level, to obtain a display parameter corresponding to a better display of the virtual object, thereby improving quality of a game screen; and a virtual object with a low importance is set to a low level, to obtain game performance corresponding to a better display of the virtual object. In this way, differentiated control on different virtual objects in the target game is achieved, and a dynamic adaptation capability of performance optimization is improved.

Figure 5:
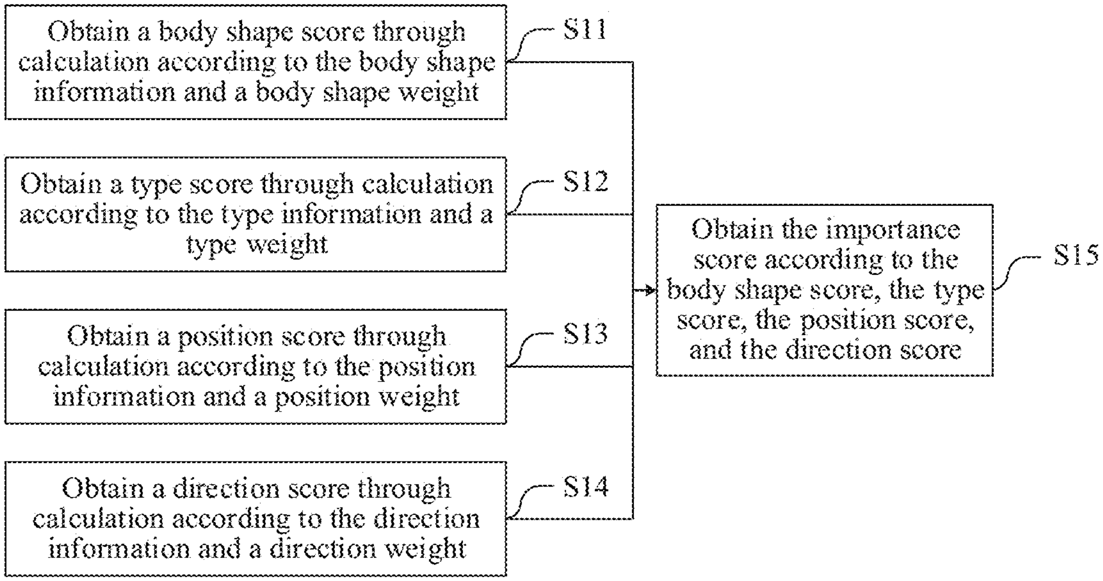
FIG. 5 is a flowchart of a virtual object control method according to another embodiment of this application.

In an optional embodiment of the virtual object control method provided in the embodiment corresponding to FIG. 4 of this application, the configuration attribute includes body shape information and type information. Referring to FIG. 5, a calculating process of the importance score includes S11 to S15, where S11, S12, S13, and S14 are parallel operations. Specifically:

S11: Obtain a body shape score through calculation according to the body shape information and a body shape weight.

Body shape scoring is performed on each virtual object according to a body shape of the virtual object, to obtain the body shape information, where the body shape information is a value between [0, 1].

S12: Obtain a type score through calculation according to the type information and a type weight.

Type scoring is performed on each virtual object according to a type of the virtual object, to obtain the type information, where the type information is a value between [0, 1].

S13: Obtain a position score through calculation according to the position information and a position weight.

A distance between each virtual object and a center of a display screen is calculated, and the calculated distance is normalized, to obtain the position information, where the position information is a value between [0, 1].

S14: Obtain a direction score through calculation according to the direction information and a direction weight.

A direction angle between each virtual object and a display screen is calculated, and the calculated angle is normalized, to obtain the direction information, where the direction information is a value between [0, 1].

S15: Obtain the importance score according to the body shape score, the type score, the position score, and the direction score.

The importance score, for example, may be obtained by performing weighted calculation on the body shape information, the type information, the position information, and the direction information. The importance score may be calculated by using the following formula:

$$S_i = F \times w_F + T \times w_T + D \times w_D + A \times w_A;$$

$S_i$ is an importance score of a virtual object i, F is body shape information of the virtual object i, T is type information of the virtual object i, D is position information of the virtual object i, A is direction information of the virtual object i, $w_F$ is a body shape weight, $w_T$ is a type weight, $w_D$ is a position weight, and $w_A$ is a direction weight.

According to the virtual object control method provided in this embodiment of this application, by using the body shape information, the type information, the position information, and the direction information of each virtual object as calculation standards of an importance score of the virtual object, differentiated control is implemented on different virtual objects in a target game.

Figure 6:
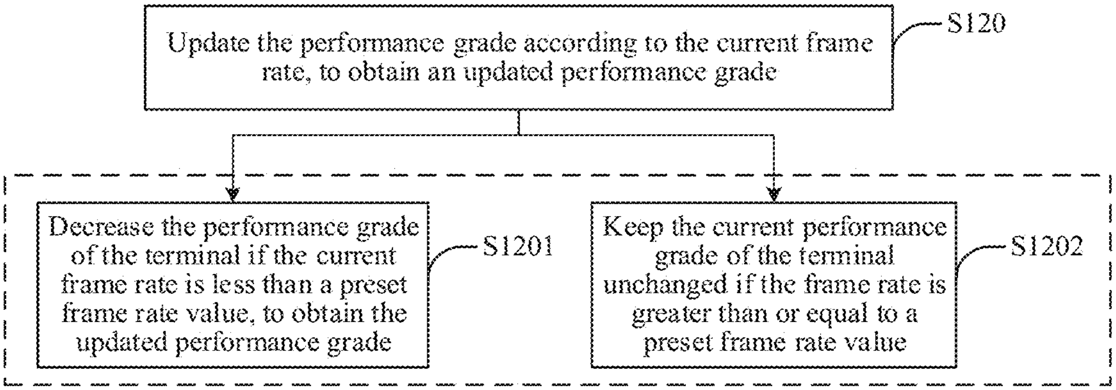
FIG. 6 is a flowchart of a virtual object control method according to another embodiment of this application.

In an optional embodiment of the virtual object control method provided in the embodiment corresponding to FIG. 2 of this application, referring to FIG. 6, S120 includes S1201 and S1202, where S1201 and S1202 are parallel operations. Specifically:

S1201: Decrease the performance grade of the terminal if the current frame rate is less than a preset frame rate value, to obtain the updated performance grade.

S1202: Keep the current performance grade of the terminal unchanged if the frame rate is greater than or equal to a preset frame rate value.

The preset frame rate value is generally 30 frames.

In a specific implementation of the embodiments of this application, when the target game is running, a current performance grade of the terminal is a grade A. If a current frame rate is 20 frames, the performance grade of the terminal is decreased to a grade B; or if a current frame rate is 30 frames or greater than 30 frames, the current performance grade is kept unchanged.

According to the virtual object control method provided in this embodiment of this application, the current frame rate is used as a grade adjustment standard of the performance grade of the terminal, thereby improving a dynamic adaptation capability of performance optimization, and omitting a process of manual adjustment by a player.

Figure 7:
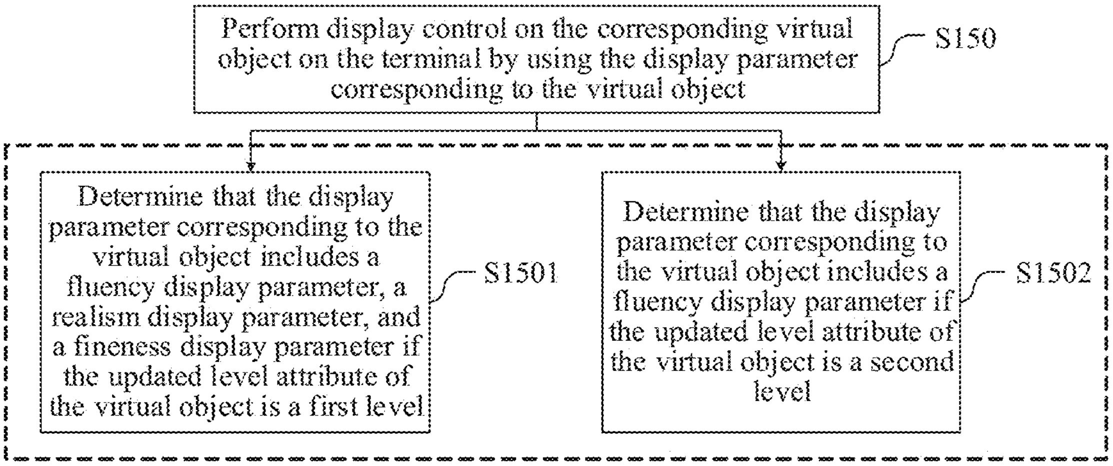
FIG. 7 is a flowchart of a virtual object control method according to still another embodiment of this application.

In an optional embodiment of the virtual object control method provided in the embodiment corresponding to FIG. 2 of this application, referring to FIG. 7, the level attribute includes a first level and a second level. S150 includes S1501 and S1502, where S1501 and S1502 are parallel operations. Specifically:

S1501: Determine that the display parameter corresponding to the virtual object includes a fluency display parameter, a realism display parameter, and a fineness display parameter if the updated level attribute of the virtual object is a first level.

S1502: Determine that the display parameter corresponding to the virtual object includes a fluency display parameter if the updated level attribute of the virtual object is a second level.

A relationship between the level attribute and the display parameter of the virtual object is shown in Table 3.

TABLE 3

| | Fluency display parameter | Realism display parameter | Fineness display parameter |
|---|---|---|---|
| First level | Enable | Enable | Enable |
| Second level | Enable | Disable | Disable |

According to the virtual object control method provided in this embodiment of this application, by configuring different display parameters for virtual objects with different levels, differentiated control is implemented on different virtual objects in a target game.

Figure 8:
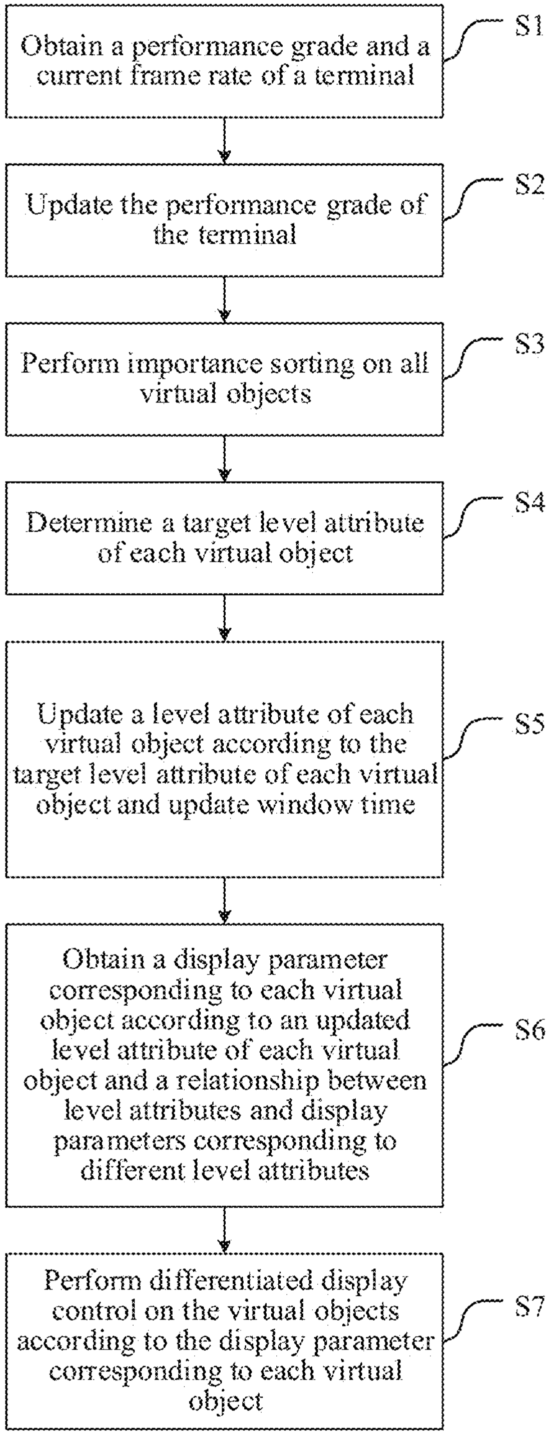
FIG. 8 is a flowchart of a virtual object control method applicable to a game A according to an embodiment of this application.

For ease of understanding, the following describes a virtual object control method applicable to a game A with reference to FIG. 8. The game A is a PVE game, and there are a total of 50 NPCs formed by virtual objects in a game process, where 30 virtual objects are displayed in a current screen. In a setting of the game A, the performance grade of the terminal includes three levels: A, B, and C, and the level attribute of the virtual object is divided into four levels: high, medium, low, and off-screen virtual object. A correspondence between the performance grade of the terminal and quantities of displayable virtual objects with different level attributes supported by the performance grade is shown in Table 4. The display parameter includes a fluency display parameter, a realism display parameter, or a fineness display parameter, where the fluency display parameter includes a client model interpolation mode, collision detection and movement prediction, and local simulation of root motion; the realism display parameter includes a physical being-attacked feedback, a death physical animation, and a high overhead animation node; and the fineness display parameter includes a client simulation update frequency and a client animation update frequency. Display parameters corresponding to different level attributes are shown in Table 5. A preset frame rate value of the game A is 30 frames. Update window time of all virtual objects in the game A is 1 second. A preset level span value of the game A is 1.

TABLE 4

| | Performance grade | | |
|---|---|---|---|
| Level attribute | A | B | C |
| High | 5 | 3 | 0 |
| Medium | 10 | 7 | 5 |
| Low | 15 | 20 | 15 |
| Off-screen virtual object | 20 | 20 | 30 |

TABLE 5

| | Fluency display parameter | | | Realism display parameter | | | Fineness display parameter | |
|---|---|---|---|---|---|---|---|---|
| | Client model interpolation mode | Collision detection and movement prediction | Local simulation of root motion | Physical being-attacked feedback | Death physical animation | High overhead animation node | Client simulation update frequency | Client animation update frequency |
| High | Exponential interpolation | Enable | Enable | Enable | Enable | Enable | High frequency | High frequency |
| Medium | Exponential interpolation | Disable | Disable | Disable | Disable | Disable | Medium frequency | Medium frequency |
| Low | Exponential interpolation | Disable | Disable | Disable | Disable | Disable | Low frequency | Low frequency |

TABLE 5-continued

| | Fluency display parameter | | | Realism display parameter | | | Fineness display parameter | |
|---|---|---|---|---|---|---|---|---|
| | Client model interpolation mode | Collision detection and movement prediction | Local simulation of root motion | Physical being-attacked feedback | Death physical animation | High overhead animation node | Client simulation update frequency | Client animation update frequency |
| Off-screen virtual object | No interpolation | Disable | Disable | Disable | Disable | Disable | Low frequency | Low frequency |

Referring to FIG. 8, the virtual object control method applicable to the game A provided in an embodiment of this application includes S1 to S7. Specifically:

S1: Obtain a performance grade and a current frame rate of a terminal.

Further, in a current running situation of the game A, the performance grade of the terminal is the grade A, and the current frame rate is 28 frames.

S2: Update the performance grade of the terminal.

Further, since the current frame rate is less than the preset frame rate value, the performance grade needs to be decreased, that is, the performance grade of the terminal is updated to the grade B.

S3: Perform importance sorting on all virtual objects.

Further, body shape information, type information, position information, and direction information corresponding to all virtual objects on a current display interface are obtained, and weighted calculation is performed on the body shape information, the type information, the position information, and the direction information corresponding to each virtual object, to obtain an importance score of the virtual object. All the virtual objects are sorted in descending order of the importance scores of all the virtual objects, to obtain importance ranks. An importance score of each virtual object in the off-screen virtual object is 0.

S4: Determine a target level attribute of each virtual object.

Further, according to the importance ranks and the updated performance grade (the grade B), target level attributes of virtual objects ranked 1 to 3 in the importance ranks are set to the high level, target level attributes of virtual objects ranked 4 to 10 in the importance ranks are set to the medium level, and target level attributes of virtual objects ranked 11 to 30 in the importance ranks are set to the low level.

S5: Update a level attribute of each virtual object according to the target level attribute of each virtual object and update window time.

Further, according to a current level attribute, the target level attribute, and the update window time of the virtual object, it is determined whether to update the level attribute of the virtual object to the target level attribute:

the target level attribute is determined as an updated level attribute of the virtual object if a level difference value between the target level attribute and the current level attribute of the virtual object is greater than the preset level span value;

the target level attribute is determined as an updated level attribute of the virtual object if a level difference value between the target level attribute and the current level attribute of the virtual object is less than or equal to the preset level span value, and the virtual object is not within the update window time of the level attribute; or the current level attribute of the virtual object is kept unchanged if a level difference value between the target level attribute and the current level attribute of the virtual object is less than or equal to the preset level span value, and the virtual object is within the update window time of the level attribute.

S6: Obtain a display parameter corresponding to each virtual object according to an updated level attribute of each virtual object and a relationship between level attributes and display parameters corresponding to different level attributes.

Further, if the updated level attribute of the virtual object is the high level, the client model interpolation mode in the fluency display parameter is set to exponential interpolation, the collision detection and the movement prediction are enabled, and the local simulation of root motion is enabled; the physical being-attacked feedback in the realism display parameter is enabled, and the death physical animation and the high overhead animation node are enabled; and the client simulation update frequency in the fineness display parameter is set to a high frequency, and the client simulation update frequency is set to a high frequency.

If the updated level attribute of the virtual object is the medium level, the client model interpolation mode in the fluency display parameter is set to exponential interpolation, the collision detection and the movement prediction are disabled, and the local simulation of root motion is disabled; the physical being-attacked feedback in the realism display parameter is disabled, and the death physical animation and the high overhead animation node are disabled; and the client simulation update frequency in the fineness display parameter is set to a medium frequency, and the client simulation update frequency is set to a medium frequency.

If the updated level attribute of the virtual object is the low level, the client model interpolation mode in the fluency display parameter is set to exponential interpolation, the collision detection and the movement prediction are disabled, and the local simulation of root motion is disabled; the physical being-attacked feedback in the realism display parameter is disabled, and the death physical animation and the high overhead animation node are disabled; and the client simulation update frequency in the fineness display parameter is set to a low frequency, and the client simulation update frequency is set to a low frequency.

If the updated level attribute of the virtual object is the off-screen virtual object, the client model interpolation mode in the fluency display parameter thereof is set to no interpolation, the collision detection and the movement prediction are disabled, and the local simulation of root motion is disabled; the physical being-attacked feedback in the realism display parameter is disabled, and the death physical animation and the high overhead animation node are disabled; and the client simulation update frequency in the fineness display parameter is set to a low frequency, and the client simulation update frequency is set to a low frequency.

S7: Perform differentiated display control on the virtual objects according to the display parameter corresponding to each virtual object.

Figure 9:
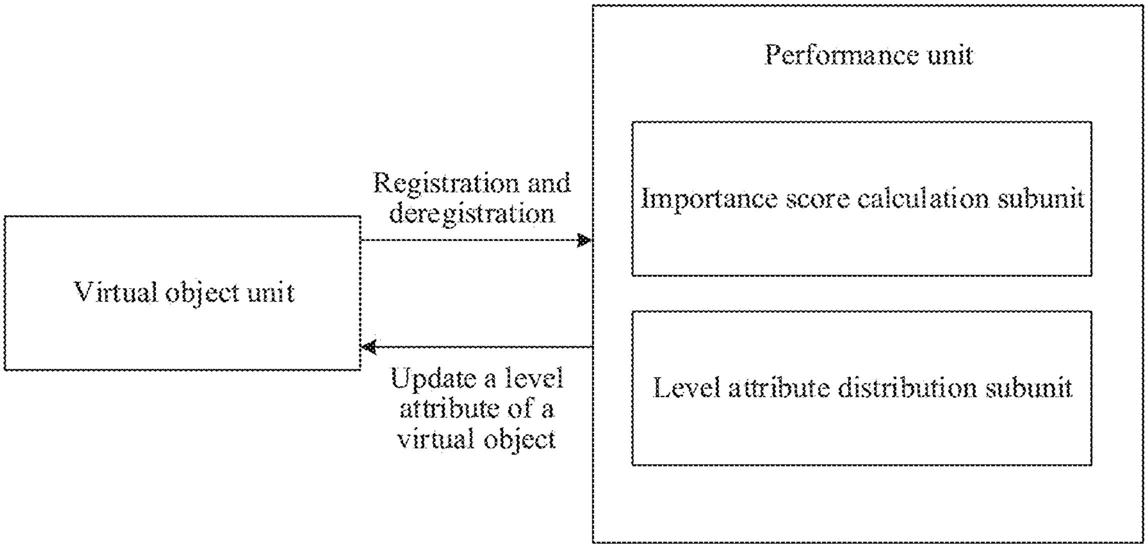
FIG. 9 is a virtual object control frame according to an embodiment of this application.

Referring to FIG. 9, a virtual object control frame provided in an embodiment of this application includes a virtual object unit and a performance unit, where the performance unit includes an importance score calculation subunit and a level attribute distribution subunit. Through interaction between the virtual object unit and the performance unit, registration and deregistration of a virtual object are implemented, and a level attribute of the virtual object is updated. An importance score of the virtual object is calculated through the importance score calculation subunit, and the level attribute of the virtual object is updated through the level attribute distribution subunit.

According to the virtual object control method provided in this embodiment of this application, level attributes of different virtual objects and display parameters corresponding to different level attributes are determined through different performance grades of a terminal, so that differentiated control is implemented on different virtual objects in a target game, thereby improving a dynamic adaptation capability of performance optimization, and omitting a process of manual adjustment by a player.

Figure 10:
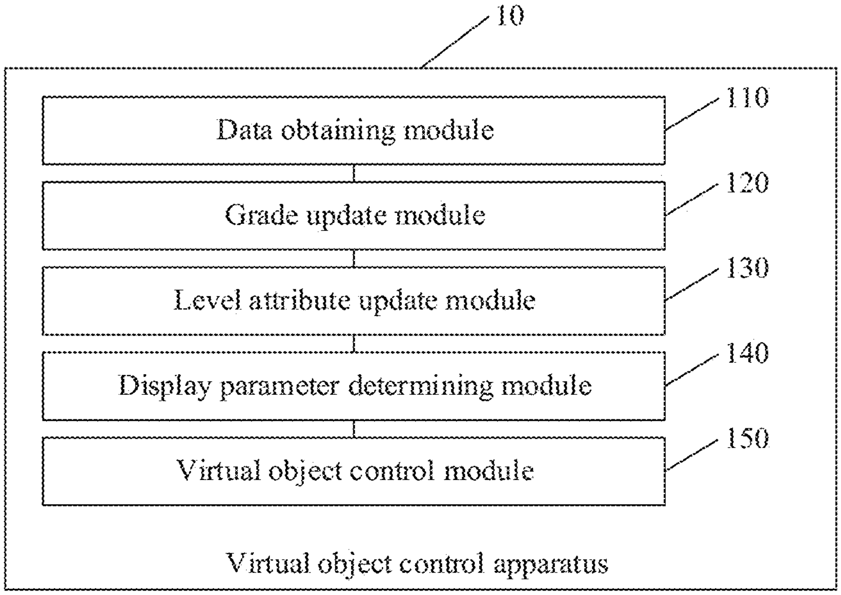
FIG. 10 is a schematic structural diagram of a virtual object control apparatus according to an embodiment of this application.

The following describes in detail a virtual object control apparatus in this application with reference to FIG. 10. FIG. 10 is a schematic diagram of an embodiment of a virtual object control apparatus 10 according to an embodiment of this application. The virtual object control apparatus 10 includes:

- a data obtaining module 110, configured to obtain a performance grade and a current frame rate of a terminal when a target game is running, the performance grade being configured for indicating quantities of virtual objects displayable by the terminal for different level attributes, and each level attribute being configured for identifying an amount of display resources consumed when the terminal displays a virtual object with the level attribute;
- a grade update module 120, configured to update the performance grade according to the current frame rate, to obtain an updated performance grade;
- a level attribute update module 130, configured to update a level attribute of each virtual object in the target game according to the updated performance grade, to obtain an updated level attribute of the virtual object;
- a display parameter determining module 140, configured to determine a display parameter corresponding to the virtual object according to the updated level attribute of the virtual object; and
- a virtual object control module 150, configured to perform display control on the corresponding virtual object by using the display parameter corresponding to the virtual object.

According to the virtual object control apparatus provided in this embodiment of this application, level attributes of different virtual objects and display parameters corresponding to different level attributes are determined through different performance grades of a terminal, so that differentiated control is implemented on different virtual objects in a target game, thereby improving a dynamic adaptation capability of performance optimization, and omitting a process of manual adjustment by a player.

In an optional embodiment of the virtual object control apparatus provided in the embodiment corresponding to FIG. 10 of this application, the level attribute update module 130 is further configured to:

- obtain update window time corresponding to the level attribute of the virtual object;
- determine a target level attribute of the virtual object according to the updated performance grade; and
- determine the target level attribute as the updated level attribute of the virtual
- object if a level difference value between the target level attribute and the current level attribute of the virtual object is greater than a preset level span value;
- determine the target level attribute as the updated level attribute of the virtual object if a level difference value between the target level attribute and the current level attribute of the virtual object is less than or equal to a preset level span value, and the virtual object is not within the update window time of the current level attribute; or
- keep the current level attribute of the virtual object unchanged if a level difference value between the target level attribute and the current level attribute of the virtual object is less than or equal to a preset level span value, and the virtual object is within the update window time of the current level attribute.

According to the virtual object control apparatus provided in this embodiment of this application, by setting update window time, a shaking problem of a virtual object during level updating is resolved, improving quality of a game screen.

In an optional embodiment of the virtual object control apparatus provided in the embodiment corresponding to FIG. 10 of this application, the level attribute update module 130 is further configured to:

- obtain a configuration attribute, position information, and direction information corresponding to the virtual object;
- calculate an importance score of the virtual object according to the configuration attribute, the position information, and the direction information;
- obtain an importance rank of the virtual object according to the importance score of the virtual object;
- determine quantities of virtual objects corresponding to different level attributes according to the updated performance grade; and
- determine the updated level attribute of the virtual object according to the importance rank and the quantities of virtual objects corresponding to different level attributes.

According to the virtual object control apparatus provided in this embodiment of this application, by calculating an importance of each virtual object, by taking the importance as an updating standard of a level attribute of the virtual object, a virtual object with a high importance is set to a high level, to obtain a display parameter corresponding to a better display of the virtual object, thereby improving quality of a game screen; and a virtual object with a low importance is set to a low level, to obtain game performance corresponding to a better display of the virtual object. In this way, differentiated control on different virtual objects in the target game is achieved, and a dynamic adaptation capability of performance optimization is improved.

In an optional embodiment of the virtual object control apparatus provided in the embodiment corresponding to FIG. 10 of this application, the configuration attribute includes body shape information and type information. A calculation process of the importance score includes:

- obtaining a body shape score through calculation according to the body shape information and a body shape weight;
- obtaining a type score through calculation according to the type information and a type weight;
- obtaining a position score through calculation according to the position information and a position weight;
- obtaining a direction score through calculation according to the direction information and a direction weight; and
- obtaining the importance score according to the body shape score, the type score, the position score, and the direction score.

According to the virtual object control apparatus provided in this embodiment of this application, by using the body shape information, the type information, the position information, and the direction information of each virtual object as calculation standards of an importance score of the virtual object, differentiated control is implemented on different virtual objects in a target game.

In an optional embodiment of the virtual object control apparatus provided in the embodiment corresponding to FIG. 10 of this application, the grade update module 120 is further configured to:

- decrease the performance grade if the current frame rate is less than a preset frame rate value, to obtain the updated performance grade; or
- keep the current performance grade of the terminal unchanged if the frame rate is greater than or equal to a preset frame rate value.

According to the virtual object control apparatus provided in this embodiment of this application, the current frame rate is used as a grade decreasing standard of the performance grade of the terminal, thereby improving a dynamic adaptation capability of performance optimization, and omitting a process of manual adjustment by a player.

In an optional embodiment of the virtual object control apparatus provided in the embodiment corresponding to FIG. 10 of this application, the level attribute includes a first level and a second level. The virtual object control module 150 is further configured to:

- determine that the display parameter corresponding to the virtual object includes a fluency display parameter, a realism display parameter, and a fineness display parameter if the updated level attribute of the virtual object is the first level; or
- determine that the display parameter corresponding to the virtual object includes a fluency display parameter if the updated level attribute of the virtual object is the second level.

According to the virtual object control apparatus provided in this embodiment of this application, by configuring different display parameters for virtual objects with different levels, differentiated control is implemented on different virtual objects in a target game.

Figure 11:
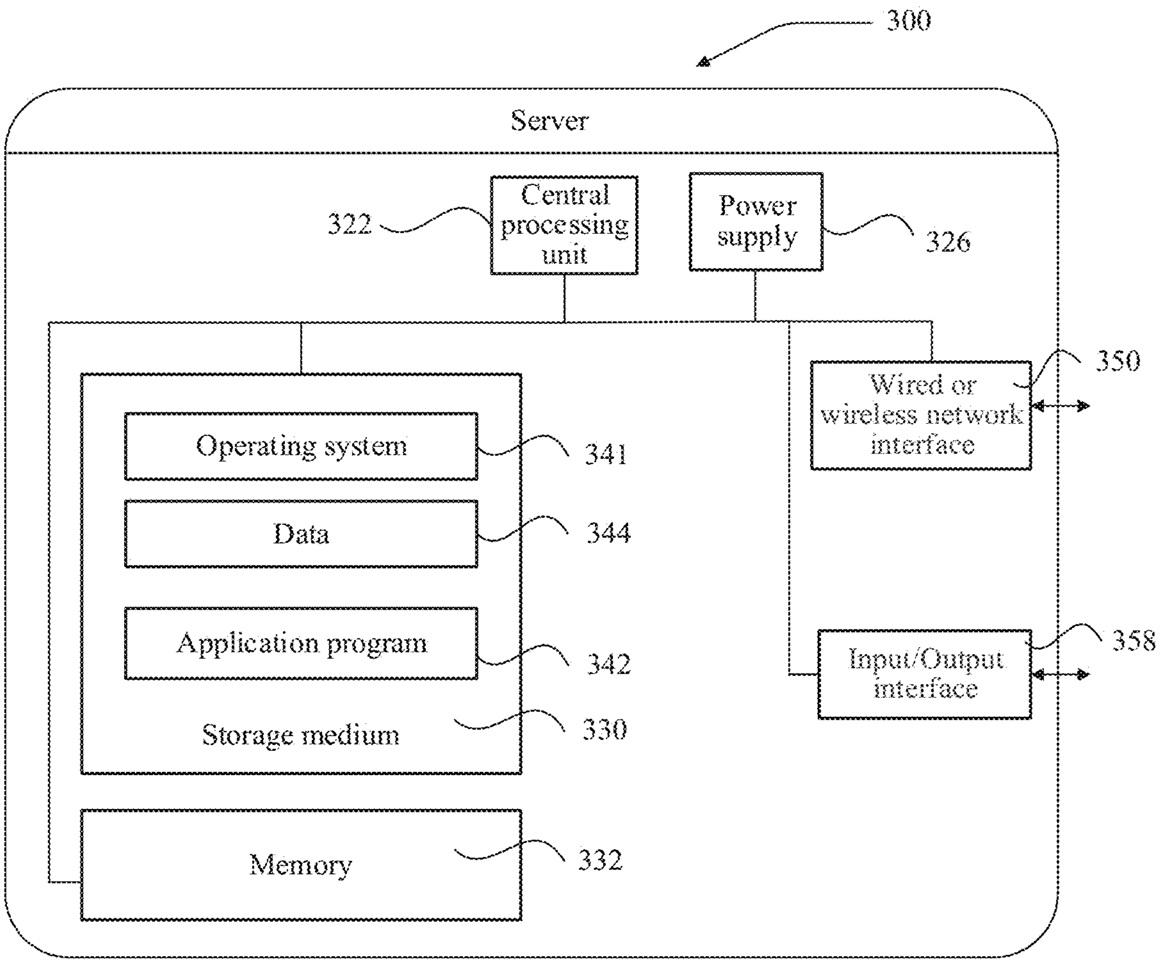
FIG. 11 is a schematic structural diagram of a server according to an embodiment of this application.

FIG. 11 is a schematic structural diagram of a server according to an embodiment of this application. The server 300 may vary greatly due to different configurations or performance, and may include one or more central processing units (CPUs) 322 (for example, one or more processors) and a memory 332, and one or more storage media 330 (for example, one or more mass storage devices) that store an application program 342 or data 344. The memory 332 and the storage medium 330 may be transient storages or persistent storages. The program stored in the storage medium 330 may include one or more modules (which are not marked in the figure), and each module may include a series of instruction operations for the server. Further, the central processing unit 322 may be configured to communicate with the storage medium 330, and perform, on the server 300, a series of instruction operations stored in the storage medium 330.

The server 300 may further include one or more power supplies 326, one or more wired or wireless network interfaces 350, one or more input/output interfaces 358, and/or one or more operating systems 341 such as Windows Server™, Mac OS X™, Unix™, Linux™, and FreeBSD™.

The operations performed by the server in the foregoing embodiments may be based on the server structure shown in FIG. 11.

In addition, an embodiment of this application further provides a storage medium, the storage medium being configured to store a computer program, and the computer program being configured for executing the method according to the foregoing embodiments.

An embodiment of this application further provides a computer program product including a computer program, and when run on a computer, the computer program product causes the computer to perform the method according to the foregoing embodiments.

It may be clearly understood by a person skilled in the art that, for the purpose of convenient and brief description, for detailed working processes of the system, the apparatus, and the units described above, reference may be made to corresponding processes in the foregoing method embodiments, and details are not described herein again.

In the embodiments provided in this application, the disclosed system, apparatus, and method may be implemented in other manners. For example, the described apparatus embodiment is merely exemplary. For example, the unit division is merely logical function division and there may be other division manners during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and the components displayed as units may or may not be physical units, may be located in one position, or may be distributed on a plurality of network units. A part of or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, the technical solutions of this application essentially, or the part contributing to the related art, or all or some of the technical solutions may be implemented in a form of a computer software product. The computer software product is stored in a storage medium and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely configured for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, and these modifications or replacements do not cause the essence of corresponding technical solutions to depart from the spirit and scope of the technical solutions in the embodiments of this application.

What is claimed is:

1. A virtual object control method performed by a computer device, the method comprising:

obtaining an initial performance grade and a current frame rate of a terminal running a target game, the initial performance grade being configured for indicating quantities of virtual objects displayable by the terminal for different level attributes, and each level attribute being configured for identifying an amount of display resources consumed when the terminal displays a virtual object with the level attribute, and the current frame rate corresponds to a total capacity of display resources that the terminal can offer for running the target game;

determining a preset frame rate required for rendering a plurality of virtual objects in the target game on the terminal according to the initial performance grade;

comparing the preset frame rate with the current frame rate;

in accordance with a determination that the current frame rate is lower than the preset frame rate:

updating the initial performance grade according to the current frame rate, to obtain an updated performance grade;

updating a level attribute of each virtual object in the target game according to the updated performance grade, to obtain an updated level attribute of the virtual object, wherein at least one of the plurality of virtual objects with a reduced level attribute when compared with the initial performance grade requires less display resources for the terminal to display the virtual object;

determining a display parameter corresponding to the virtual object according to the updated level attribute of the virtual object; and performing display control on the corresponding virtual object on the terminal by using the display parameter corresponding to the virtual object.

2. The method according to claim 1, wherein the updating a level attribute of each virtual object in the target game according to the updated performance grade, to obtain an updated level attribute of the virtual object comprises:

obtaining update window time corresponding to the level attribute of the virtual object;

determining a target level attribute of the virtual object according to the updated performance grade; and determining the target level attribute as the updated level attribute of the virtual object if a level difference value between the target level attribute and the current level attribute of the virtual object is greater than a preset level span value;

determining the target level attribute as the updated level attribute of the virtual object if a level difference value between the target level attribute and the current level attribute of the virtual object is less than or equal to a preset level span value, and the virtual object is not within the update window time of the current level attribute; or keeping the current level attribute of the virtual object unchanged if a level difference value between the target level attribute and the current level attribute of the virtual object is less than or equal to a preset level span value, and the virtual object is within the update window time of the current level attribute.

3. The method according to claim 1, wherein the updating a level attribute of each virtual object in the target game according to the updated performance grade, to obtain an updated level attribute of the virtual object comprises:

obtaining a configuration attribute, position information, and direction information corresponding to the virtual object;

calculating an importance score of the virtual object according to the configuration attribute, the position information, and the direction information;

obtaining an importance rank of the virtual object according to the importance score of the virtual object;

determining quantities of virtual objects corresponding to different level attributes according to the updated performance grade; and determining the updated level attribute of the virtual object according to the importance rank and the quantities of virtual objects corresponding to different level attributes.

4. The method according to claim 3, wherein the configuration attribute comprises body shape information and type information; and a calculation process of the importance score comprises:

obtaining a body shape score through calculation according to the body shape information and a body shape weight;

obtaining a type score through calculation according to the type information and a type weight;

obtaining a position score through calculation according to the position information and a position weight;

obtaining a direction score through calculation according to the direction information and a direction weight; and obtaining the importance score according to the body shape score, the type score, the position score, and the direction score.

5. The method according to claim 1, wherein the level attribute comprises a first level and a second level; and the determining a display parameter corresponding to the virtual object according to the updated level attribute of the virtual object comprises:

determining that the display parameter corresponding to the virtual object comprises a fluency display parameter, a realism display parameter, and a fineness display parameter if the updated level attribute of the virtual object is the first level; or determining that the display parameter corresponding to the virtual object comprises a fluency display parameter if the updated level attribute of the virtual object is the second level.

6. A computer device, comprising: a memory, a transceiver, a processor, and a bus system;

the memory being configured to store a computer program;

the bus system being configured to connect the memory and the processor, to cause the memory to communicate with the processor; and the processor being configured to execute the computer program in the memory, to perform a virtual object control method including:

obtaining an initial performance grade and a current frame rate of a terminal running a target game, the initial performance grade being configured for indicating quantities of virtual objects displayable by the terminal for different level attributes, and each level attribute being configured for identifying an amount of display resources consumed when the terminal displays a virtual object with the level attribute, and the current frame rate corresponds to a total capacity of display resources that the terminal can offer for running the target game;

determining a preset frame rate required for rendering a plurality of virtual objects in the target game on the terminal according to the initial performance grade:

comparing the preset frame rate with the current frame rate;

in accordance with a determination that the current frame rate is lower than the preset frame rate:

updating the initial performance grade according to the current frame rate, to obtain an updated performance grade;

updating a level attribute of each virtual object in the target game according to the updated performance grade, to obtain an updated level attribute of the virtual object, wherein at least one of the plurality of virtual objects with a reduced level attribute when compared with the initial performance grade requires less display resources for the terminal to display the virtual object;

determining a display parameter corresponding to the virtual object according to the updated level attribute of the virtual object; and performing display control on the corresponding virtual object on the terminal by using the display parameter corresponding to the virtual object.

7. The computer device according to claim 6, wherein the updating a level attribute of each virtual object in the target game according to the updated performance grade, to obtain an updated level attribute of the virtual object comprises:

obtaining update window time corresponding to the level attribute of the virtual object;

determining a target level attribute of the virtual object according to the updated performance grade; and determining the target level attribute as the updated level attribute of the virtual object if a level difference value between the target level attribute and the current level attribute of the virtual object is greater than a preset level span value;

determining the target level attribute as the updated level attribute of the virtual object if a level difference value between the target level attribute and the current level attribute of the virtual object is less than or equal to a preset level span value, and the virtual object is not within the update window time of the current level attribute; or keeping the current level attribute of the virtual object unchanged if a level difference value between the target level attribute and the current level attribute of the virtual object is less than or equal to a preset level span value, and the virtual object is within the update window time of the current level attribute.

8. The computer device according to claim 6, wherein the updating a level attribute of each virtual object in the target game according to the updated performance grade, to obtain an updated level attribute of the virtual object comprises:

obtaining a configuration attribute, position information, and direction information corresponding to the virtual object;

calculating an importance score of the virtual object according to the configuration attribute, the position information, and the direction information;

obtaining an importance rank of the virtual object according to the importance score of the virtual object;

determining quantities of virtual objects corresponding to different level attributes according to the updated performance grade; and determining the updated level attribute of the virtual object according to the importance rank and the quantities of virtual objects corresponding to different level attributes.

9. The computer device according to claim 8, wherein the configuration attribute comprises body shape information and type information; and a calculation process of the importance score comprises:

obtaining a body shape score through calculation according to the body shape information and a body shape weight;

obtaining a type score through calculation according to the type information and a type weight;

obtaining a position score through calculation according to the position information and a position weight;

obtaining a direction score through calculation according to the direction information and a direction weight; and obtaining the importance score according to the body shape score, the type score, the position score, and the direction score.

10. The computer device according to claim 6, wherein the level attribute comprises a first level and a second level; and the determining a display parameter corresponding to the virtual object according to the updated level attribute of the virtual object comprises:

determining that the display parameter corresponding to the virtual object comprises a fluency display parameter, a realism display parameter, and a fineness display parameter if the updated level attribute of the virtual object is the first level; or determining that the display parameter corresponding to the virtual object comprises a fluency display parameter if the updated level attribute of the virtual object is the second level.

11. A non-transitory computer-readable storage medium, comprising a computer program, the computer program, when run on a processor of a computer device, causing the computer device to perform a virtual object control method including:

obtaining an initial performance grade and a current frame rate of a terminal running a target game, the initial performance grade being configured for indicating quantities of virtual objects displayable by the terminal for different level attributes, and each level attribute being configured for identifying an amount of display resources consumed when the terminal displays a virtual object with the level attribute, and the current frame rate corresponds to a total capacity of display resources that the terminal can offer for running the target game;

determining a preset frame rate required for rendering a plurality of virtual objects in the target game on the terminal according to the initial performance grade;

comparing the preset frame rate with the current frame rate;

in accordance with a determination that the current frame rate is lower than the preset frame rate:

updating the initial performance grade according to the current frame rate, to obtain an updated performance grade;

updating a level attribute of each virtual object in the target game according to the updated performance grade, to obtain an updated level attribute of the virtual object, wherein at least one of the plurality of virtual objects with a reduced level attribute when compared with the initial performance grade requires less display resources for the terminal to display the virtual object;

determining a display parameter corresponding to the virtual object according to the updated level attribute of the virtual object; and performing display control on the corresponding virtual object on the terminal by using the display parameter corresponding to the virtual object.

12. The non-transitory computer-readable storage medium according to claim 11, wherein the updating a level attribute of each virtual object in the target game according to the updated performance grade, to obtain an updated level attribute of the virtual object comprises:

obtaining update window time corresponding to the level attribute of the virtual object;

determining a target level attribute of the virtual object according to the updated performance grade; and determining the target level attribute as the updated level attribute of the virtual object if a level difference value between the target level attribute and the current level attribute of the virtual object is greater than a preset level span value;

determining the target level attribute as the updated level attribute of the virtual object if a level difference value between the target level attribute and the current level attribute of the virtual object is less than or equal to a preset level span value, and the virtual object is not within the update window time of the current level attribute; or keeping the current level attribute of the virtual object unchanged if a level difference value between the target level attribute and the current level attribute of the virtual object is less than or equal to a preset level span value, and the virtual object is within the update window time of the current level attribute.

13. The non-transitory computer-readable storage medium according to claim 11, wherein the updating a level attribute of each virtual object in the target game according to the updated performance grade, to obtain an updated level attribute of the virtual object comprises:

obtaining a configuration attribute, position information, and direction information corresponding to the virtual object;

calculating an importance score of the virtual object according to the configuration attribute, the position information, and the direction information;

obtaining an importance rank of the virtual object according to the importance score of the virtual object;

determining quantities of virtual objects corresponding to different level attributes according to the updated performance grade; and determining the updated level attribute of the virtual object according to the importance rank and the quantities of virtual objects corresponding to different level attributes.

14. The non-transitory computer-readable storage medium according to claim 13, wherein the configuration attribute comprises body shape information and type information; and a calculation process of the importance score comprises:

obtaining a body shape score through calculation according to the body shape information and a body shape weight;

obtaining a type score through calculation according to the type information and a type weight;

obtaining a position score through calculation according to the position information and a position weight;

obtaining a direction score through calculation according to the direction information and a direction weight; and obtaining the importance score according to the body shape score, the type score, the position score, and the direction score.

15. The non-transitory computer-readable storage medium according to claim 11, wherein the level attribute comprises a first level and a second level; and the determining a display parameter corresponding to the virtual object according to the updated level attribute of the virtual object comprises:

determining that the display parameter corresponding to the virtual object comprises a fluency display parameter, a realism display parameter, and a fineness display parameter if the updated level attribute of the virtual object is the first level; or determining that the display parameter corresponding to the virtual object comprises a fluency display parameter if the updated level attribute of the virtual object is the second level.

* * * * *